Oct. 6, 1925.

G. E. BATES 1,556,400

DIRECTION INDICATOR FOR MOTOR VEHICLES

Filed March 26, 1924  3 Sheets-Sheet 1

INVENTOR.
George E. Bates
BY
ATTORNEY.

Oct. 6, 1925.
G. E. BATES
1,556,400
DIRECTION INDICATOR FOR MOTOR VEHICLES
Filed March 26, 1924
3 Sheets-Sheet 2
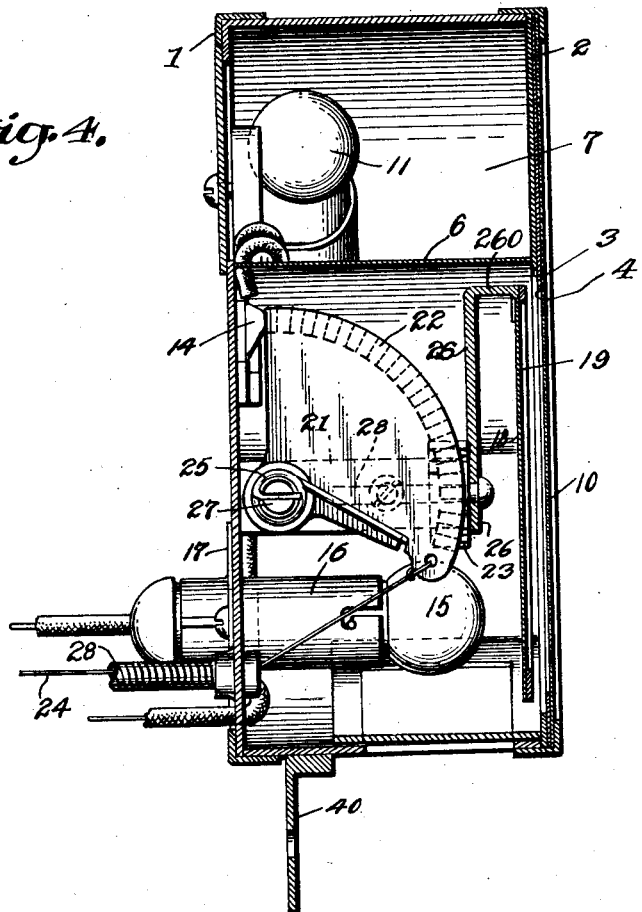
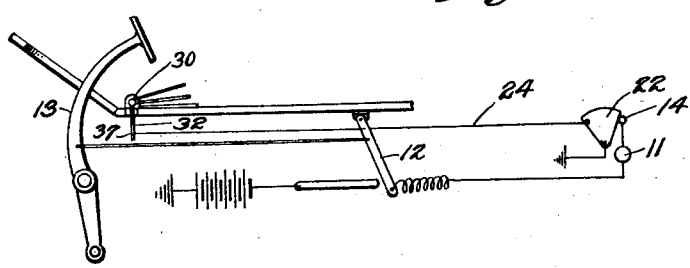
INVENTOR.
George E Bates
BY
ATTORNEY.

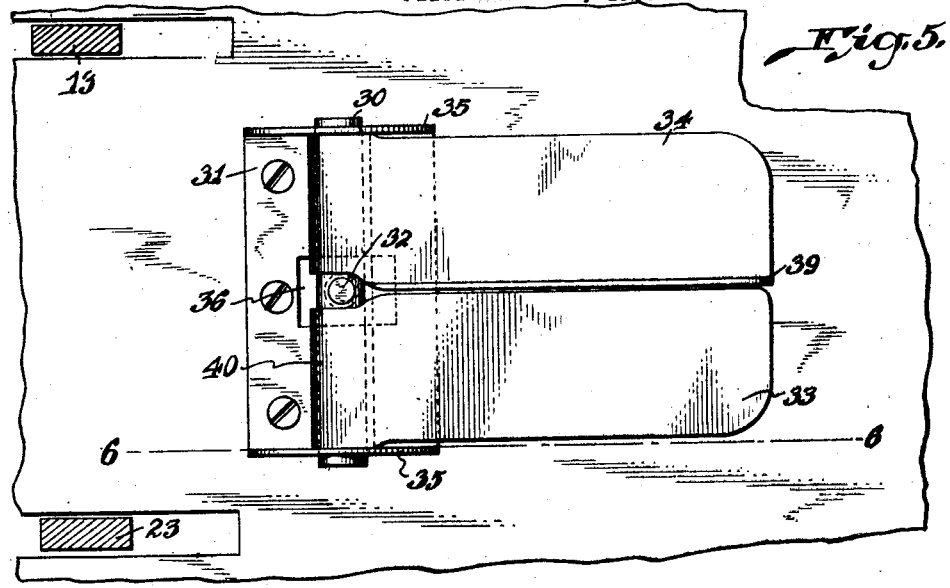
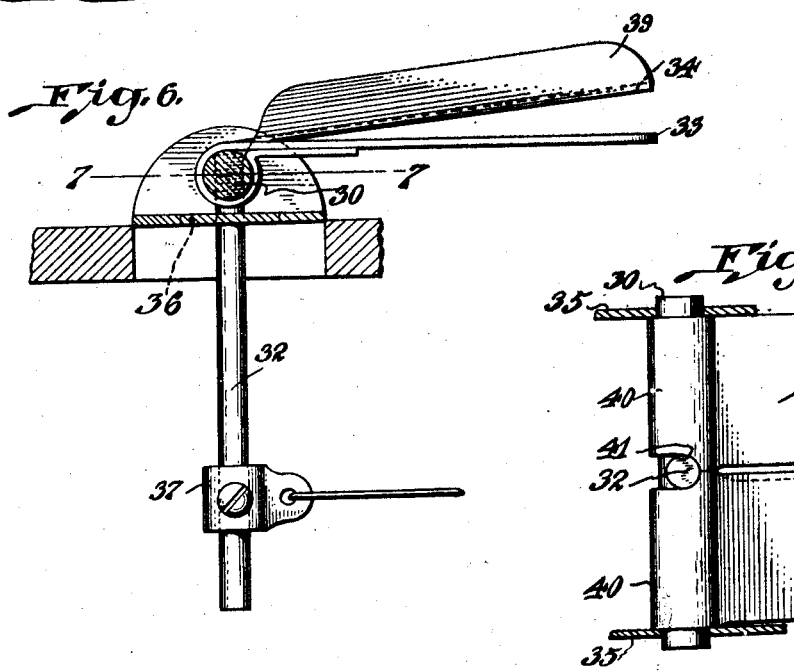

Patented Oct. 6, 1925.

1,556,400

UNITED STATES PATENT OFFICE.

GEORGE E. BATES, OF SYRACUSE, NEW YORK.

DIRECTION INDICATOR FOR MOTOR VEHICLES.

Application filed March 26, 1924. Serial No. 702,129.

*To all whom it may concern:*

Be it known that I, GEORGE E. BATES, a citizen of the United States, and a resident of Syracuse, in the county of Onondaga and State of New York, have invented a certain new and useful Direction Indicator for Motor Vehicles, of which the following is a specification.

This invention relates to traffic signals for vehicles or more specifically direction indicators for motor vehicles, and has for its object a traffic signal or direction indicator in which the stop signal, the tail light, and the direction indicator is embodied as a unit in a case, and in which the direction indicator signal is built into or is a part of a tail light or other signal, that is, it is located within the area that is usually occupied by the colored or red glass of the tail light. It also has for its object a particularly simple and easily and conveniently operable actuating mechanism for the direction indicator.

The invention consists in the novel features and in the combinations and constructions hereinafter set forth and claimed.

In describing this invention, reference is had to the accompanying drawings in which like characters designate corresponding parts in all the views.

Figure 4 is a vertical sectional view partly in elevation taken centrally approximately on Fig. 3.

Figure 5 is a plan view of the operating means for the direction indicator member, the floor of the car and the relative position of the clutch and brake pedals being shown.

Figure 6 is a sectional view on line 6—6, Fig. 5.

Figure 7 is a fragmentary inverted sectional view on line 7—7, Fig. 6.

Figure 8 is a diagrammatic view of the operating means for the stop signal lamp and the direction indicator.

Figure 1:
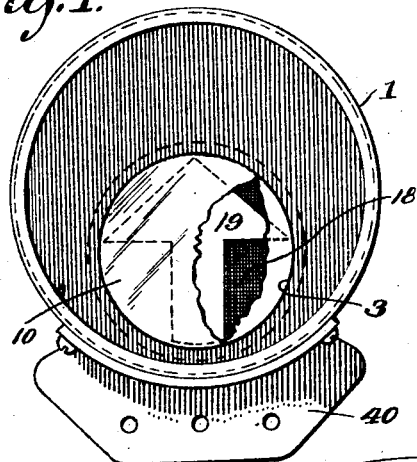
Figure 1 is an elevation or face view of this traffic signal.
Figure 2:
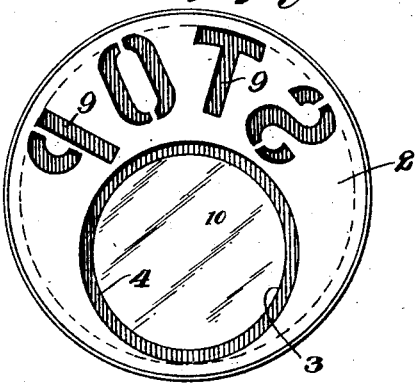
Figure 2 is an inner face view of the space or rear wall the casing being removed.
Figure 3:
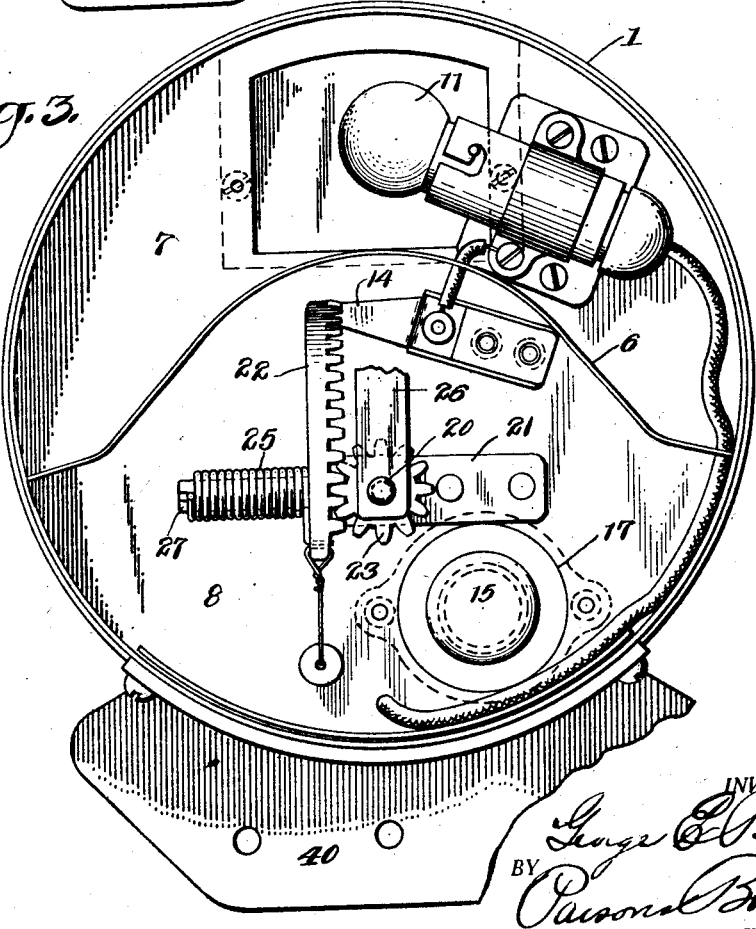
Figure 3 is an enlarged view similar to Fig. 1, the rear wall of the casing and the indicator member or disk being removed.

This traffic signal comprises generally a case provided with a wall having a window opening and a lamp in the rear of said wall, a movable direction indicator member arranged in line with the window and movable about an axis located centrally of the window, the indicator member comprising a background wall and an indicator portion carried by the background wall and movable therewith when the indicator member is moved about an axis, the background wall with the indicator portion being arranged between the window and the lamp and one of said walls being provided with means for giving a color to the light passing through the window from the lamp and means for operating the indicating member about its axis.

More specifically this traffic signal comprises generally a casing having a window in a wall thereof, such wall being formed with a transparent colored margin around the window, a movable direction indicator member having a transparent or translucent portion in line with the window, and a lamp in the casing arranged to project the light through the colored margin and through the transparent portion of the indicator member and means for operating the indicator member.

It further includes the combination of a stop signal including a lamp, operating means to close the circuit through the lamp, such circuit including a switch member which is movable with the operating means for the direction indicator, so that, upon operation of the direction indicator, the stop signal lamp circuit will be broken if it is closed by the regular operating or circuit closing means for the stop signal lamp. However, the stop signal feature may if desired be omitted.

1 designates the casing, which is here shown as cylindrical in form, and having front and rear walls, one of these walls, as the rear wall 2 or a wall facing rearwardly relatively to the vehicle having a window 3, and a transparent colored margin 4 around the window. As the casing is preferably mounted at the rear end of the vehicle, the rear wall thereof is the one provided with the window which serves as a tail light, through which the direction indicator is visible. The light need not be a tail light, but the term tail light is used merely for convenience. It will be understood that, if the casing is differently located, the signal or direction indicator may be arranged to face in a forward direction, or the signal may be made double to be seen from both the front and the rear.

The case is also formed with a transverse partition 6 dividing it into upper and lower compartments 7, 8, and the rear wall is formed in the portion there opposite the upper compartment, with letters 9 cut therethrough, spelling the word Stop, so that, when the stop lamp is illuminated the word Stop appears through the cut out or stencilled letters. Usually a transparent plate overlies the rear wall, this plate being usually colored red with the exception of the portion 10 overlying the window opening. The margin 4 of the red portion however extends inwardly far enough to overlie the edge of the window opening 3, so that, the window on account of its red or colored margin serves as a tail light when the tail lamp is lighted.

The stop lamp 11 is connected in an electric circuit including a normally open switch 12, operable at will to close and open the circuit. Such switch is operable by any suitable means, usually the brake pedal 13, so that, when the brake pedal is operated this switch 12 is closed and the stop lamp illuminated in the usual manner. The stop lamp circuit also includes a contact 14 and a member of the operating mechanism for the direction indicating signal, such member engaging this contact and normally closing the circuit to the stop lamp 11, whenever the switch 12 is closed by the operation of the foot pedal 13, and serves to break the circuit when the direction indicator operating mechanism is operated and the switch 12 is closed by the depression of the brake pedal 13.

The tail lamp 15 is mounted in a suitable socket 16, carried by a plate 17 detachably secured to the rear wall of the casing below the partition 6, and is connected in a circuit in any suitable manner.

The traffic signal or direction indicator member is arranged in line with the window 3, and moves about an axis coincident with that of the window 3.

As here illustrated, the direction indicator includes a back ground disk 18 having a transparent or translucent portion in the form of an arrow or pointer 19. Usually, the arrow is of a white translucent material as glass or celluloid. The disk is movable about its axis different distances to carry the arrow 19 to point to the left or right from a starting position. It is shown as carried by a shaft 20 journalled in the bracket 21 mounted on a wall, as the front wall or portion of the casing. The operating mechanism for the disk 18 or shaft 20 comprises a segment 22 carried by the bracket and meshing with the pinion 23 on the shaft 20, a pull cord or wire 24 connected to the segment to move it in one direction and a spring 25 connected to the segment 22 to move it in the other direction and means for operating the pull cord or wire different distances.

The disk 18 is here shown as carried by an arm 26 mounted on the rear end of the shaft 20, and the spring 25 is coiled about the spindle 27 on which the segment 22 is mounted, and is fixed at one end to the segment and at its other end to the spindle. This segment 22 normally engages the contact 14 in the stop lamp circuit, and when the pull wire is operated moves out of engagement with the contact, and thus breaks the circuit in the stop lamp circuit in case the circuit is closed by the switch 12, the segment being a conductor in the stop lamp circuit.

The arm 26 is spaced from the disk and is connected to the margin of the disk by an angular extension 260. The arrangement of the arm relatively to the tail light is such that no shadow is cast on the arrow as would otherwise be the case if the disk were mounted on the shaft 20.

The pull cord or wire 24 extends through a suitable tubular casing 24ª to mechanism operable to pull the same, which mechanism is preferably located in the front of the vehicle near the clutch and brake pedals 28 and 13, where it can be conveniently operated by the feet with the feet on or off the pedals or when one foot, as the right foot, is in position to operate the foot accelerator.

The mechanism for operating the pull cord or wire comprises a rock shaft 30 mounted on a suitable bracket 31 on the floor of the automobile near the clutch and brake pedals 28 and 13, a single rock arm 32 depending from the shaft 30 and to which the pull cord or wire 24 is connected and a pair of pedals 33, 34, on the shaft 30, and are located to rotate the disk 18 in accordance with the pedal depressed.

As here shown, the bracket 31 is formed with uprights 35 in which the rock shaft 30 is mounted, and the rock arm 32 extends through a slot 36 in such bracket and a slot in the floor board, and the pull cord or wire 24 is connected to a collar 37 mounted on the arm and adjustable different distances along such arm to take up slack within limits and to adjust the amount of effective throw or the leverage of the rock arm.

The pedals 33, 34 are here shown as formed with hubs 38 on the shaft 30, the right hand pedal 34 being usually arranged at a higher level than the left hand pedal 33, as it operates the direction indicator signal a greater distance than the left hand pedal, and the right hand pedal 34 is formed with a flange 39 on its left hand side which acts as a shield to prevent the right foot from depressing the left hand pedal or the left foot from depressing the right hand pedal. The movements of pedals are limited by suitable stops or by the pedals striking the floor. Each pedal 33 or 34 is shown as formed with a tubular hub or roll 40 on the shaft 30, the hub being formed with a shoulder 41 against the rear side of the rod 32, the hub filling the space between each upright 35 and the rod 32.

In operation, the stop light is operated in the usual way by depressing the brake pedal 13. When it is desired to signal that the car is to take a left hand turn, the left hand pedal 33 is depressed to its full extent, so that the arrow 19 points to the left, the motion being transmitted through the pedal 33, rock shaft 30, pull cord 24, segment 22, gear 23, and shaft 20, to the direction indicator disk 18. When the foot is removed from the left hand pedal 33, the spring 25 returns the parts to their starting positions.

When it is desired to make a right hand turn, the right pedal 34 is depressed to its full extent and, as the right hand pedal is capable of further depression than the left hand a greater movement is transmitted by the right hand pedal 24 than when the left hand pedal is depressed, and the direction indicator disk 18 and arrow are moved from their starting positions a distance of 270° or ¾ of a circle, and upon releasing the right hand pedal 34, the spring 25 returns the parts to their original position. As before stated, when either pedal 33 or 34 is operated, the segment 22 moves out of engagement with the contact 14 and breaks the circuit through the stop signal lamp so that the circuit to the stop lamp is broken in case the circuit is closed by the operation of the switch 12 by the brake pedal 13.

The casing is also formed with a suitable bracket 40 to which a license plate may be connected and with an opening through which light from the tail lamp is projected on the license plate.

This combined traffic and tail light is particularly advantageous in that it is comparatively small and compact in construction and in fact, in so far as the tail light is concerned, requires no more space than the ordinary tail light and in so far as the stop signal is concerned requires no more than the ordinary combined stop signal and tail light.

It is further advantageous in that the operating mechanism is particularly simple and compact in construction and consists of few parts which cannot get out of order, particular attention being called to the pull cord which pulls in both forward and retrograde directions. It is further advantageous in that, owing to the operating means, the signal is operated almost unconsciously by the feet.

What I claim is:—

1. In a traffic signal, the combination of a case provided with a wall having a window opening and a lamp in the rear of the wall, a movable direction indicator member arranged in line with the window and movable about an axis located substantially centrally of the window, the indicator member comprising a back-ground wall and an indicator portion carried by the background wall and movable therewith when the indicator is moved about its axis, the background wall being arranged between the window and the lamp and one of said walls being provided with means to give color to the light passing through the window from the lamp and means for operating the background about its axis.

2. In a traffic signal for vehicles, the combination of a case having a window in a wall thereof, such wall being formed with a transparent colored margin around the window, a direction indicator member located within the colored margin and movable about an axis located at the center of the window, and having a transparent indicator portion arranged in line with the window, a lamp in the case arranged to project light through the colored margin and through the transparent portion of the indicator member, and means for actuating the indicator member about its axis to carry said portion into different radial positions.

3. In a traffic signal for vehicles, the combination of a case, having a window provided in a wall thereof, such wall being provided with a transparent colored margin around the window, a movable direction indicator member, comprising a background plate arranged in line with the window and mounted to move about an axis located at the center of the window, and having a transparent indicator portion extending across such axis, and a lamp arranged in the case to project light through the colored margin and through the transparent indicator portion, and means for actuating the indicator member about its axis to carry said portion into different radial positions.

4. In a traffic signal, the combination of a case having a glass window, a lamp in the rear of the glass, a background disk mounted in line with the window concentric therewith, and being of less diameter than the window providing an annular margin through which light passes around the edge of the disk, the disk comprising a transparent pointer movable therewith and through which the light from the lamp passes, and means for moving the disk about its axis.

5. In a traffic signal, the combination of a signal light having a colored glass window, and a lamp in the rear of the window, and a movable direction indicator member mounted to move about an axis located at the center of said window, said member being located in line with the window, the direction indicator member including a transparent pointer, and means for operating the direction indicator member about its axis to carry the pointer into different radial positions.

6. In a traffic signal, the combination of a case provided with a wall having a window opening, and a lamp in the rear of said wall, and a movable direction indicator member arranged in line with the window and movable about an axis located centrally of the window, the indicator member comprising a background wall, and a transparent or translucent indicator portion carried by the background wall and movable therewith, when the indicator member is moved about its axis, the background being arranged between the window and the lamp, and one of said walls being provided with means to give a signal color to the light passing through the window from the lamp, and means for operating the indicator member about its axis.

7. In a traffic signal, the combination of a case having a window in a wall thereof, such wall being provided with a transparent colored margin around the window, a movable direction indicator member comprising a background plate arranged in line with the window, movable about an axis located centrally of the window, and a transparent or translucent indicator portion carried by the background plate, a lamp arranged in the case in the rear of the plate to project light through the transparent portion of the background plate and through the colored margin, and means for moving the indicator member about its axis to carry said portion into different radial positions.

8. In a traffic signal for vehicles, the combination of a case having a window provided in a wall thereof, such wall being provided with a transparent colored margin around the window, an indicator member comprising a background plate arranged within the case and within the colored margin and mounted to move about an axis located concentrically with the window and the colored margin, the indicator member having a transparent indicator portion, a lamp arranged in the case and located in position to project light through the transparent indicator portion and through the colored margin of said wall, and means for operating the indicator member about its axis.

9. In a direction indicator, the combination of a normally inactive stop signal, and means for operating the stop signal, a direction indicator normally pointing toward the stop signal, means for operating the indicator to point to the right or to the left, including a part operating to render the stop signal inactive, when the operating means for the stop light signal is operated at the time the direction indicator is operated, whereby the stop signal is ineffective when the indicator is pointing to the right or to the left.

In testimony whereof, I have hereunto signed my name, at Syracuse, in the county of Onondaga, and in the State of New York, this 14 day of March, 1924.

GEORGE E. BATES.